US009594712B2

(12) United States Patent
Laichinger (10) Patent No.: US 9,594,712 B2
(45) Date of Patent: Mar. 14, 2017

(54) DEVICE, METHOD AND SYSTEM FOR COMMUNICATING WITH A CONTROL UNIT OF A MOTOR VEHICLE

(71) Applicant: Robert Bosch GmbH, Suttgart (DE)

(72) Inventor: Martin Laichinger, Ebersbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 189 days.

(21) Appl. No.: 14/332,085

(22) Filed: Jul. 15, 2014

(65) Prior Publication Data
US 2015/0026372 A1 Jan. 22, 2015

(30) Foreign Application Priority Data
Jul. 16, 2013 (DE) .................... 10 2013 213 856

(51) Int. Cl.
*G06F 13/40* (2006.01)
*G07C 5/00* (2006.01)
*G06F 13/42* (2006.01)

(52) U.S. Cl.
CPC ......... *G06F 13/4004* (2013.01); *G07C 5/008* (2013.01); *G06F 13/4208* (2013.01); *G07C 2205/02* (2013.01)

(58) Field of Classification Search
CPC .. G06F 13/385; G06F 13/387; G06F 13/4004; G06F 13/4027; G06F 13/4045; G05D 1/0016; G05D 1/0022; G07C 5/00; G07C 5/008; G06B 23/00; B60R 25/00; H04L 12/66
See application file for complete search history.

(56) References Cited

U.S. PATENT DOCUMENTS

| | | | | |
|---|---|---|---|---|
| 5,835,873 A * | 11/1998 | Darby | .................... | B60R 21/01 180/268 |
| 6,225,898 B1 * | 5/2001 | Kamiya | ................. | G07C 5/008 340/10.1 |
| 2003/0052801 A1 * | 3/2003 | McClure | ................. | H04L 12/66 341/50 |
| 2005/0038921 A1 * | 2/2005 | McClure | ............. | H04L 12/4135 710/1 |
| 2009/0307454 A1 * | 12/2009 | Moessner | .......... | G05B 19/0426 711/170 |
| 2010/0262357 A1 * | 10/2010 | Dupuis | ................. | F02D 41/042 701/112 |
| 2011/0246707 A1 * | 10/2011 | Ito | ....................... | G06F 12/1466 711/103 |
| 2012/0203441 A1 * | 8/2012 | Higgins | ............... | G07C 5/0858 701/102 |
| 2013/0151660 A1 * | 6/2013 | Imai | ....................... | H04L 67/12 709/217 |

(Continued)

Primary Examiner — Thomas J Cleary
(74) Attorney, Agent, or Firm — Gerard Messina (57) ABSTRACT

A control unit for controlling or regulating a component, including a processing arrangement for controlling or regulating the component for connecting the control unit to a bus for communicating with a further control unit; an application tool port for connecting the control unit to an application tool for communicating with the control unit; and a connecting arrangement for connecting the application tool port and the bus port so that the application tool is able to communicate via the bus port, and a bus, a motor vehicle, a method, an application tool, and computer program products.

14 Claims, 5 Drawing Sheets

(56) References Cited

U.S. PATENT DOCUMENTS

| | | | |
|---|---|---|---|
| 2013/0173112 A1* | 7/2013 | Takahashi | H04L 9/0894 701/36 |
| 2013/0185766 A1* | 7/2013 | Fujiki | H04L 63/08 726/3 |
| 2014/0067231 A1* | 3/2014 | Mosher | F02D 28/00 701/102 |
| 2014/0121891 A1* | 5/2014 | Barrett | H04L 69/08 701/33.2 |
| 2014/0195108 A1* | 7/2014 | Schumacher | G07C 5/008 701/36 |
| 2014/0207629 A1* | 7/2014 | Bradley | G06Q 10/087 705/28 |
| 2015/0051787 A1* | 2/2015 | Doughty | G07C 5/008 701/31.5 |
| 2015/0246658 A1* | 9/2015 | Flick | B60R 25/24 701/2 |

\* cited by examiner

DEVICE, METHOD AND SYSTEM FOR COMMUNICATING WITH A CONTROL UNIT OF A MOTOR VEHICLE

RELATED APPLICATION INFORMATION

The present application claims priority to and the benefit of German patent application no. 10 2013 213 856.3, which was filed in Germany on Jul. 16, 2013, the disclosure of which is incorporated herein by reference.

FIELD OF THE INVENTION

The present invention relates to a device, to a method, and to a system for communicating with a control unit of a motor vehicle, in particular for determining and setting application data of the control unit.

BACKGROUND INFORMATION

Figure 1:
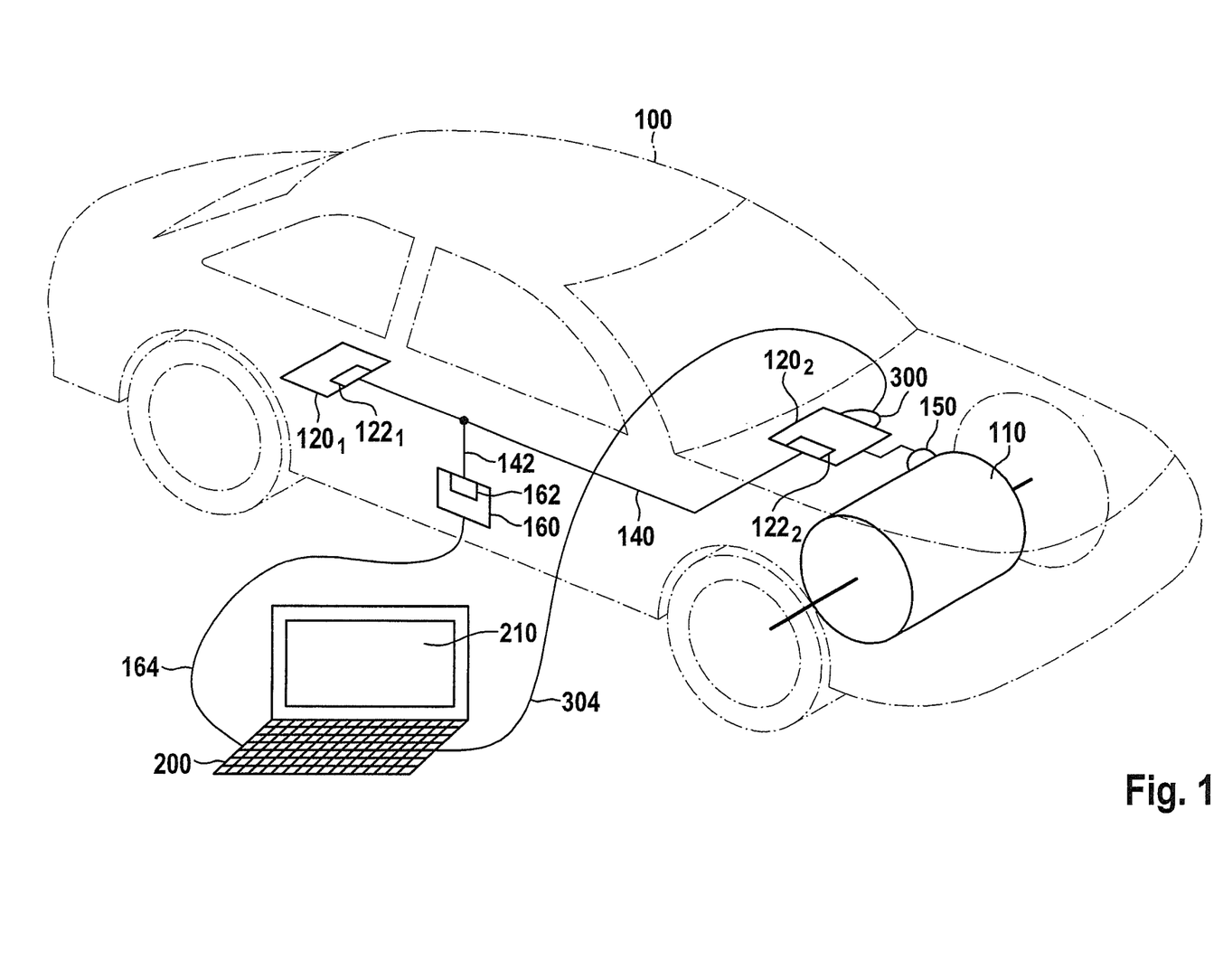
FIG. 1 shows a motor vehicle having access possibilities for a communication according to the related art.

As is shown in FIG. 1, control units (control devices, electronic control units, ECUs) $120_1$, $120_2$ are used in a motor vehicle 100 for controlling and/or regulating components of motor vehicle 100, such as an engine control unit $120_2$ for controlling and regulating a vehicle engine 110 during its operation. Control units $120_1$, $120_2$ may have up to 20,000 measured variables representing the operation and up to 20,000 parameters to be set and/or to be optimized. Control units $120_1$, $120_2$ may be connected to each other via a vehicle bus 140, such as a Controller Area Network bus (CAN bus) or FlexRay, for exchanging data between control units $120_1$, $120_2$.

During an application process, application data of a control unit $120_1$, $120_2$ are determined and set. In a simplified representation, the application process includes:
1. measuring an actual behavior, which is represented by internal variables of control unit $120_1$, $120_2$, data from other control units $120_1$, $120_2$ on vehicle bus 140, and measuring data from sensors 150 which are connected;
2. comparing the actual behavior to a setpoint behavior;
3. optimizing the application data and/or eliminating faults which are found; and
4. transmitting the optimized application data from the application process to control unit $120_1$, $120_2$ for storing the transmitted application data in control unit $120_1$, $120_2$.

During measuring and transmission, there are generally multiple access possibilities for communicating or transmitting the data in vehicle 100:
1. via a port (interface) $122_1$, $122_2$ of control unit $120_1$, $120_2$ for vehicle bus 140, port $122_1$, $122_2$ generally also being used for a vehicle diagnosis during the development and the operation of motor vehicle 100. Advantages of vehicle bus port $122_1$, $122_2$ include a diagnostic functionality, such as erasing a fault memory and providing diagnostic services, and the elimination of additional hardware arrangement in control unit $120_1$, $120_2$ since vehicle bus port $122_1$, $122_2$ is also present during series production. Disadvantages of vehicle bus port $122_1$, $122_2$ include limited performance capability (performance) and the need for an additional interface (gateway module) 160 having a vehicle bus port 162 and a link 164 for connecting vehicle bus 140 to an external computer (such as a personal computer or laptop) 200; and
2. via a special emulator probe (ETK) 300 having a link 304, which is able to read data from a memory of the control circuit or of control unit $120_1$, $120_2$ and/or write data into the memory, such as via a debug interface of a control circuit (controller) of control unit $120_1$, $120_2$. Emulator probe 300 is connected to application tool 210 via a further interface for this purpose. Advantages of emulator probe 300 include a high performance capability when transmitting data and/or accessing the memory. According to the related art, both access types are required for the application process. To this end, vehicle bus 140, which often times is accessible only with difficulty, must be disconnected for measuring. If vehicle bus 140 is to be available on a diagnostic connector, an additional link, such as line 142, and an additional interface 160, which generally requires a dedicated power supply, must be provided—in every motor vehicle 100. The disadvantage is thus in particular the complexity for the wiring and/or additional hardware arrangement.

When updating (flashing) a (control) program of a control unit $120_2$ via emulator probe 300, a driving function must be deactivated for principle-related reasons and/or for safety reasons. Since control unit $120_2$ to be updated does not transmit any data via vehicle bus 140, the other control units are aware of the absence of the data and switch, as intended, into a fault operating mode. However, to end the fault operating mode, a defined communication via vehicle bus port $122_1$, $122_2$ is required. The disadvantage is thus that generally both access types are required for updating a control unit $120_2$.

SUMMARY OF THE INVENTION

It is therefore an object of the present invention to provide a method, a device, and a system for improved communication with a control unit of a motor vehicle.

This object may be achieved by the accompanying method, device and system as described herein.

One aspect of the present invention relates to a control unit 120', $120_2$' for controlling or regulating a component 110, including processing arrangement 124, 126 for controlling or regulating component 110; a bus port 122 for connecting control unit 120', $120_2$' to a bus 140 for communicating with one or multiple further control units $120_1$; an application tool port 128 for connecting control unit 120', $120_2$' to an application tool 210' for communicating with control unit 120', $120_2$'; and connecting arrangement 130 for connecting application tool port 128 and bus port 122 so that application tool 210' is able to communicate via bus 140.

As a result of this aspect of the present invention, the data related to bus or vehicle bus 140 are also transmitted via control unit 120', $120_2$', emulator probe 300 and application tool 210', since bus port or vehicle bus port 122, $122_2$ and application tool port or emulator probe port or emulator port 128, which are situated in control unit 120', $120_2$', are logically connected. Since emulator probe 300 and application tool 210' have a high performance capability, this interface may also make the communication with vehicle bus 140 and, for example, with other control units $120_1$' available, in addition to the communication with connected control unit $120_2$'. In this way, only one access type, including one connector and one link, such as line 304, is required for the application process, and vehicle bus 140 no longer has to be disconnected for measuring.

Moreover, the additional interface to vehicle bus 140, including the additional link or line, is dispensed with. Since the link between motor vehicle 100 and computer 200 takes place via a single access type, control units 120', $120_1$', $120_2$' and computer 200 use a single shared grounding potential, so that galvanic isolation may generally be dispensed with. The approach is thus more cost-effective, weight-saving and less prone to faults and malfunctions. Moreover, the approach allows easy and user-friendly updating of control units $120_1'$, $120_2'$.

A further aspect of the present invention relates to a control unit 120', $120_2'$, connecting arrangement 130 being configured as a circuit.

A further aspect of the present invention relates to a control unit 120', $120_2'$, connecting arrangement 130 being configured via a debug interface of an emulator 300.

A further aspect of the present invention relates to a control unit 120', $120_2'$, connecting arrangement 130 being configured by program instructions 1264 which are carried out in control unit 120', $120_2'$.

A further aspect of the present invention relates to a control unit 120', $120_2'$, processing arrangement 124, 126 including a processor 124 and a memory 126, and the program instructions being stored in memory 126 and carried out by a processor 124.

A further aspect of the present invention relates to a control unit 120', $120_2'$, application tool port 128 being configured as an emulator probe port 128.

A further aspect of the present invention relates to a bus 140 for control units 120', $120_1'$, $120_2'$, including control unit 120', $120_2'$ according to the present invention.

A further aspect of the present invention relates to a motor vehicle 100, including bus 140.

A further aspect of the present invention relates to a method for operating a control unit 120', $120_2'$, including connecting an application tool port 128 and a bus port 122 of control unit 120', $120_2'$ so that an application tool 210', which is connected to application tool port 128, is able to communicate via bus port 140. A further aspect of the present invention relates to a computer program product, including a computer program which is stored on a data carrier or in a memory 126 of a control unit 120', $120_1'$, $120_2'$ and includes commands which are readable by control unit 120', $120_1'$, $120_2'$ and which are intended for carrying out the method according to the present invention when the commands are carried out in control unit 120', $120_1'$, $120_2'$.

A further aspect of the present invention relates to a computer program product as recited in the accompanying claim. A further aspect relates to a computer program which includes computer instructions. The computer instructions are stored in a memory of a computer and include commands which are readable by the computer and which are intended for carrying out the above-described method when the commands are carried out on the computer. The computer program may also be stored on a memory medium or be downloaded from a server via a corresponding network. As a result of this aspect of the present invention, it is possible to reduce or entirely avoid changes in the composition of control unit 120', $120_2'$; the exact temporal behavior may differ from that of other aspects of the present invention.

A further aspect of the present invention relates to a computer-implemented method which runs under real-time conditions or basically real-time conditions.

A further aspect of the present invention relates to an application tool 210' for communicating with control unit 120', $120_2'$, application tool 210' being configured in such a way that it is able to communicate via application tool port 128 in order to communicate via bus 140.

A further aspect of the present invention relates to a computer program product, including a computer program which is stored on a data carrier or in a memory of a computer 200 and includes commands which are readable by computer 200 and which are intended for the use of application tool 210' according to the present invention when the commands are carried out on computer 200.

A further aspect of the present invention relates to a system, including a control unit 120', $120_2'$, a bus 140 and an application tool 210'.

Moreover, aspects of the present invention may be combined with each other.

The following detailed description describes the features, advantages and alternative specific embodiments of exemplary embodiments of the present invention with reference to the accompanying drawings, in which similar reference numerals denote similar elements.

DETAILED DESCRIPTION

Figure 2:
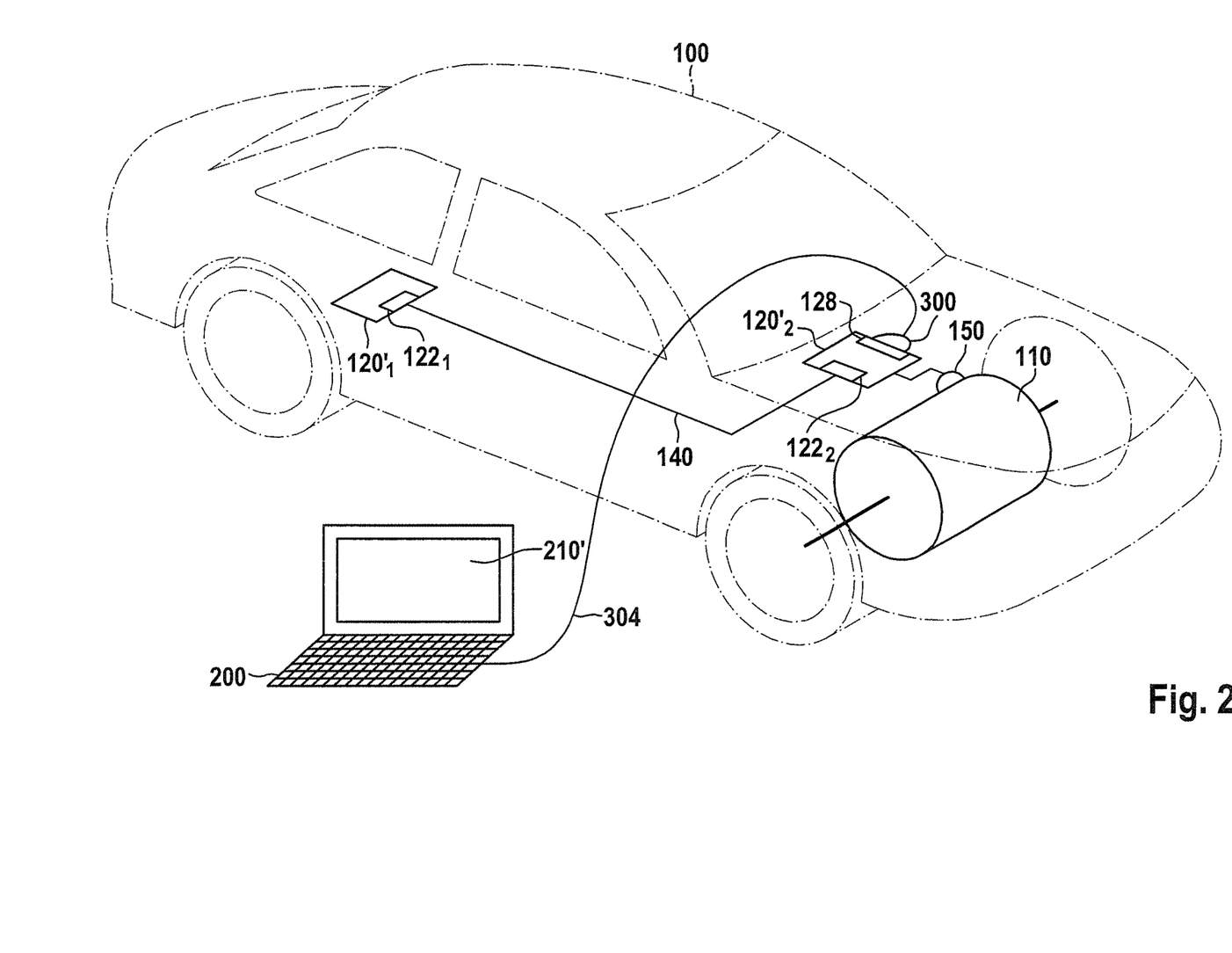
FIG. 2 shows a motor vehicle having an access possibility for a communication according to the present invention.

FIG. 2 shows a motor vehicle 100 having an access possibility for a communication according to the present invention. For example, motor vehicle 100 may be a passenger car, a truck, a motorcycle or a specialty or special-purpose vehicle. Motor vehicle 100 includes control units (electronic control units, ECUs) $120_1'$, $120_2'$ for controlling and/or regulating components of motor vehicle 100, such as an engine control unit $120_2'$ for controlling and regulating a vehicle engine 110 during its operation. Control units $120_1'$, $120_2'$ may be connected to each other via a vehicle bus 140, such as a Controller Area Network bus (CAN bus) or FlexRay, for exchanging data between control units $120_1'$, $120_2'$.

For communicating or transmitting data during measuring and setting, a debug interface or emulator interface 128 of a control unit $120_2'$ of motor vehicle 100 is connected via a (removable) emulator probe (ETK) 300 and a link 304 to an application tool 210'. Application tool 210' may be a computer program which is carried out, for example, on a computer (such as a personal computer or laptop) 200 external from motor vehicle 100. For example, link 304 may take place by wire, wirelessly, such as with the aid of Bluetooth or a wireless local area network (WLAN), or with the aid of optical waveguides.

Figure 3:
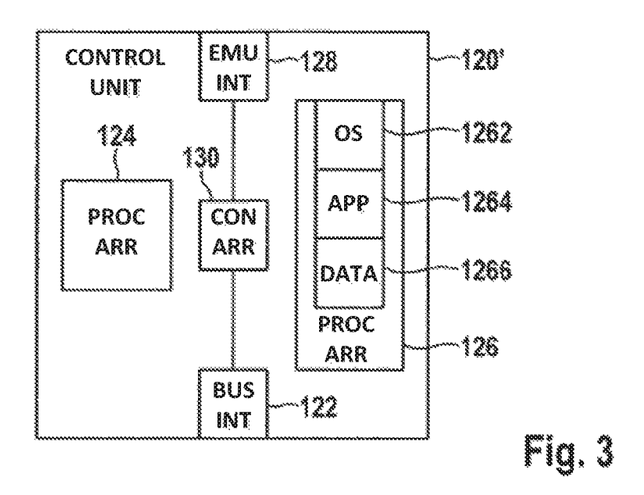
FIG. 3 shows a schematic illustration of a control unit according to the present invention.

FIG. 3 shows a schematic illustration of a control unit 120' according to the present invention. Control unit 120' includes a vehicle bus interface 122, a processor 124, a memory 126, an emulator interface 128 and a connecting arrangement 130.

Vehicle bus interface 122 is connectable to vehicle bus 140 of motor vehicle 100 and supports CAN bus, FlexRay and/or Ethernet, for example. Processor 124 may be a microprocessor or a microcontroller, for example. Memory 126 may include a volatile and a non-volatile memory. Memory 126 may be situated partially or entirely in processor 124. For example, memory 126 may include an operating system 1262, an application program 1264 and data 1266. For example, the data may include parameters, such as control parameters, and measured variables. Control unit 120' may have approximately 20,000 measured variables representing the operation and approximately 20,000 parameters to be set and/or to be optimized.

Emulator interface 128 is connectable to emulator probe 300, such as for a diagnosis or for trouble-shooting. Connecting arrangement 130 connects emulator interface 128 and vehicle bus interface 122, so that communication signals coming from emulator probe 300 and intended for vehicle bus 140 are transmittable from emulator interface 128 to vehicle bus interface 122, and communication signals coming from vehicle bus 140 are transmittable from vehicle bus interface 122 to emulator interface 128. Via emulator probe 300 and emulator interface 128, application tool 210' is thus able to read operating system 1262, application program 1264 and/or data 1266 from memory 126, analyze the same in memory 126 and/or write the same into memory 126, and moreover it is able to communicate via vehicle bus interface 122 and vehicle bus 140 with other control units, for example. To this end, application tool 210', such as by adapting a transfer layer for packaging and sending vehicle bus data, may be configured in such a way that it transmits the communication signals intended for vehicle bus 140 via link 304 to emulator probe 300, or emulator probe 300 may include an interface, such as a vehicle bus interface, to which a vehicle bus port of application tool 210' is connectable. Emulator probe 300 may furthermore include a processor or a field-programmable gate array (FPGA). Connecting arrangement 130 may be configured as a circuit (hardware), as a computer-implementable method (software), as the debug interface present in the controller, or as a combination thereof.

Figure 4:
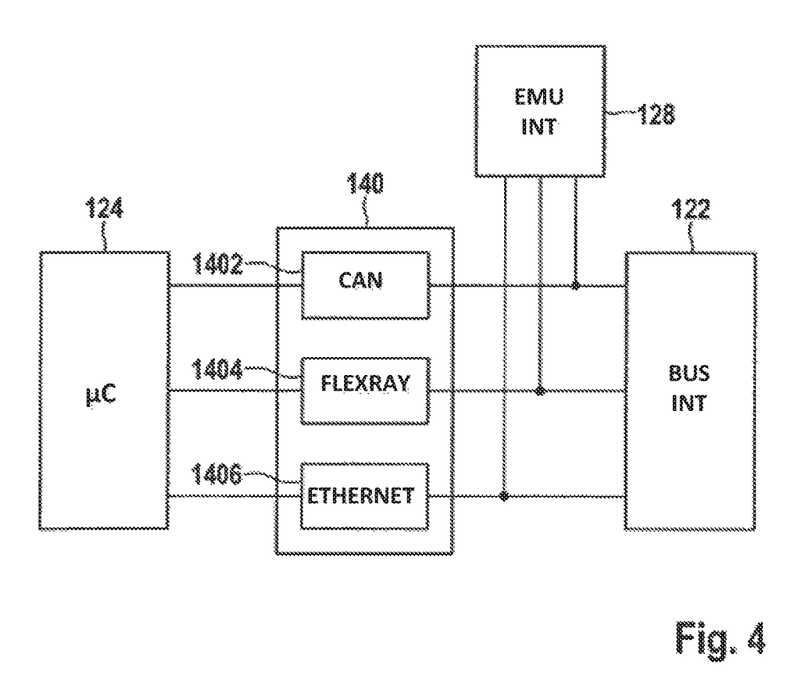
FIG. 4 shows a schematic illustration of a communication circuit of a control unit according to the present invention.

FIG. 4 shows a schematic illustration of an exemplary communication circuit of a control unit 120' according to the present invention. Communication circuit of control unit 120' includes a microcontroller 124, a transceiver circuit (transceiver) 140 having a CAN transceiver 1402, a FlexRay transceiver 1404, and an Ethernet transceiver 1406, a vehicle bus interface 122 and an emulator interface 128. Microcontroller 124 may include bus interfaces, such as for CAN, FlexRay, Media Independent Interface (MII) and/or Reduced Media Independent Interface (RMII). Microcontroller 124 is connected in each case via signal lines to CAN transceiver 1402, FlexRay transceiver 1404 and Ethernet transceiver 1406, which, in turn, are connected in each case via signal lines to vehicle bus interface 122. Emulator interface 128 is also connected in each case via signal lines to CAN transceiver 1402, FlexRay transceiver 1404 and PHYTER Ethernet transceiver 1406. These signal lines, as shown in FIG. 4, may be connected between transceivers 1402, 1404 and 1406 and vehicle bus interface 122. As an alternative, these signal lines may also be connected between microcontroller 124 and transceivers 1402, 1404 and 1406. Emulator interface 128 may include transceiver and/or interface drivers, such as hardware and/or software interface drivers.

Connecting arrangement 130 thus may include corresponding connections (taps) when control unit 120' is switched. The connections may be decoupled, such as galvanically isolated.

Figure 5:
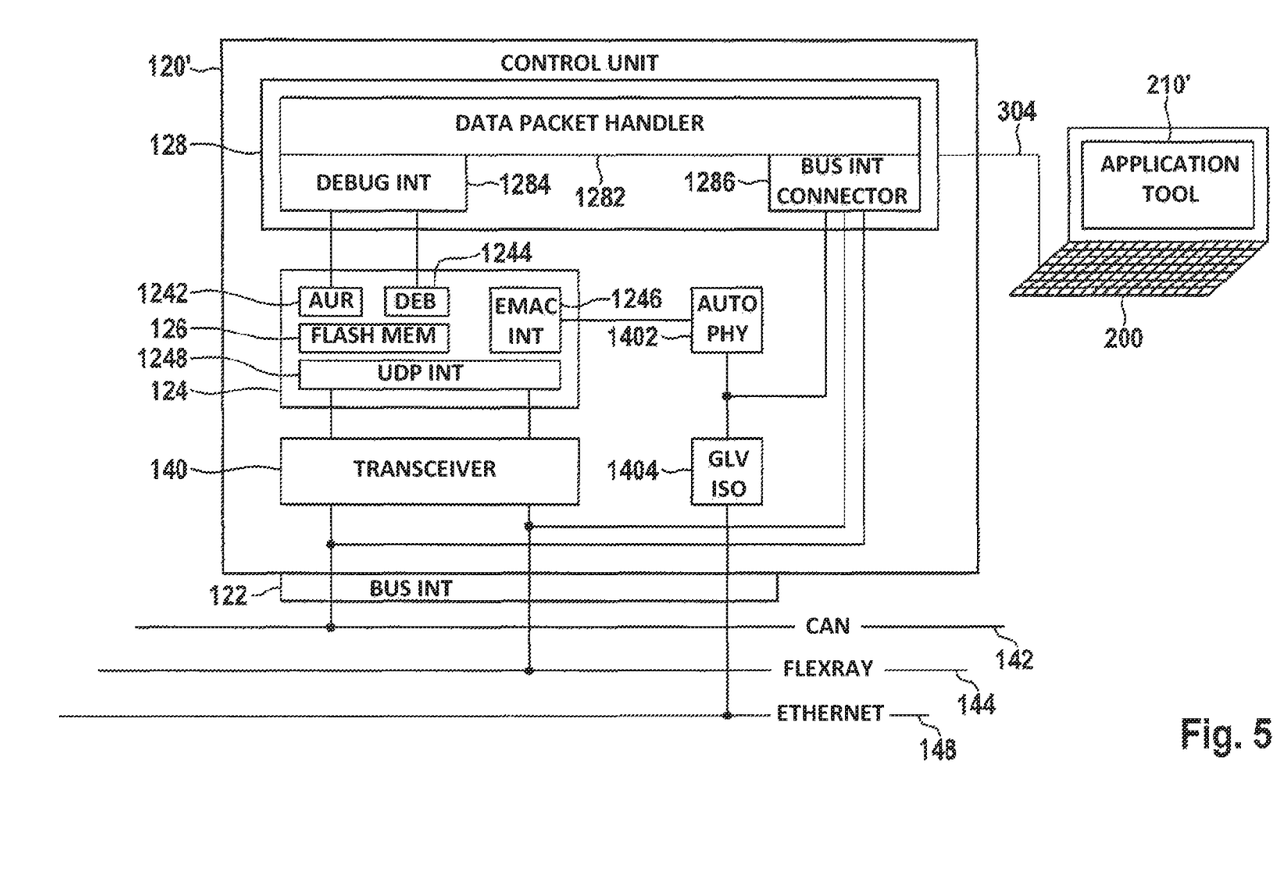
FIG. 5 shows a detailed schematic illustration of an overall circuit of the control unit according to one specific embodiment of the present invention.

FIG. 5 shows a detailed schematic illustration of an exemplary overall circuit of control unit 120' according to one specific embodiment of the present invention. Control unit 120' includes a vehicle bus interface 122, a microcontroller 124, an emulator interface 128, a transceiver 140 (for CAN and FlexRay), a PHYTER Ethernet (auto-PHY) module 1402 and a galvanic isolation element 1404. Microcontroller 124 includes an Aurora Trace interface 1242, a Joint Test Action Group (JTAG)/Debug Access Port (DAP) debug interface 1244, an Ethernet media access control (EMAC) interface 1246, a Universal Measurement and Calibration Protocol (XCP) on CAN, FlexRay/User Datagram Protocol (UDP) interface 1248, and a flash memory 126.

Emulator interface 128 includes a data packet handler 1282 as well as a debug interface 1284 and a bus interface connection (bus interface adapter) 1286, which are each connected to data packet handler 1282. As was already described with respect to FIG. 4, microcontroller 124 is connected to vehicle bus interface 122 via XCP on CAN, FlexRay, UDP interface 1248 and transceiver 140, or via EMAC interface 1246, auto-PHY module 1402 and galvanic isolation element 1404. Moreover, microcontroller 124 is connected to debug interface 1284 of emulator interface 128 via Aurora Trace interface 1242 and JTAG/DAP debug interface 1244. The circuit described so far is also usable for control unit 120' described hereafter with reference to FIG. 6. As was already described with reference to FIG. 4, emulator interface 128 is moreover connected via bus interface connection 1286 to the signal lines between transceiver 140 and vehicle bus interface 122. Moreover, emulator interface 128 is connected via bus interface connection 1286 to a signal line between auto-PHY module 1402 and galvanic isolation element 1404.

On the one hand, control unit 120' is connected via vehicle bus interface 122 to a vehicle bus including CAN 142, FlexRay 144 and PHYTER Ethernet, such as BroadR-Reach automotive Ethernet 148, and on the other hand, it is connected via emulator interface 128, a link 304, and a notebook computer 200 to application tool 210'. Application tool 210' is thus able to communicate with other control units via vehicle bus interface 122 and vehicle bus 140 with the aid of appropriate control of emulator interface 128, bypassing microcontroller 124.

Figure 6:
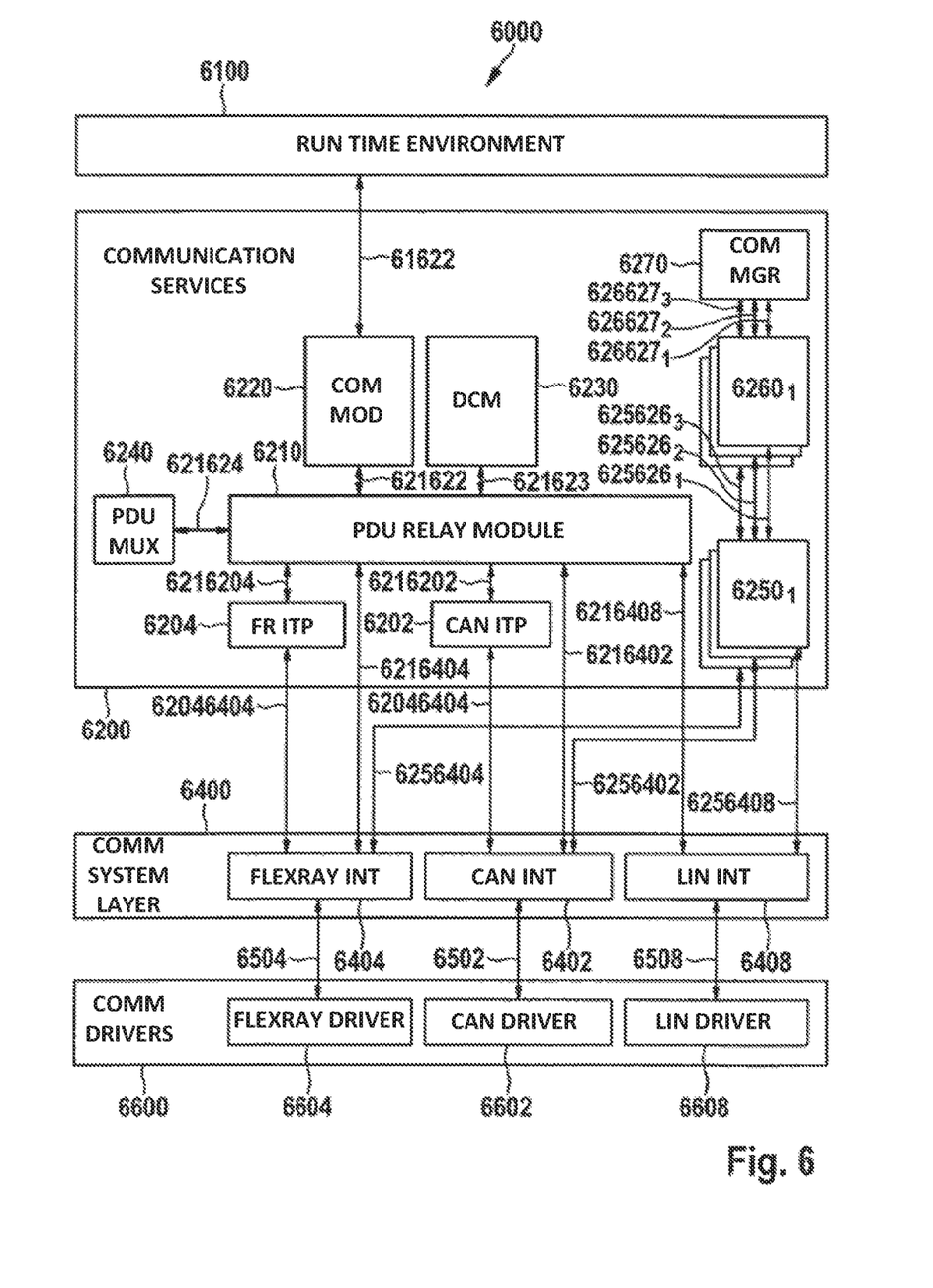
FIG. 6 shows a schematic illustration of the communication software layer to the measuring signal layer of the control unit according to one further specific embodiment of the present invention.

FIG. 6 shows a detailed schematic illustration of an exemplary overall program 6000 of control unit 120' according to one further specific embodiment of the present invention. Control unit 120' is implemented according to a software architecture, such as the AUTomotive Open System ARchitecture (AUTOSAR, www.autosar.org), as a computer-implemented method. Overall program 6000 has a run time environment 6100, communication services 6200, communication system abstraction (communication hardware abstraction) mayer 6400, and communication drivers 6600.

Run time environment 6100 is a computer program executed together with an application program which is not able to communicate directly with an operating system, and renders the application program in the control unit runnable on a computer by relaying between the application program and the operating system.

Communication services 6200 include a CAN transport protocol (CAN TP) 6202, a FlexRay ISO transport protocol (FlexRay ISO TP) 6204, a protocol data unit (PDU) relay module (PDU router) 6210, a communication module 6220, such as an AUTOSAR communication module (AUTOSAR COM), a diagnostic communication management module (diagnostic communication manager, DCM) 6230, a protocol data unit (PDU) multiplexer 6240, three network management (NM) interface modules 6250$_1$, 6250$_2$ and 6250$_3$, three generic network management (NM) modules 6260$_1$, 6260$_2$ and 6260$_3$, and one communication management module (communication manager) 6270. Protocol data unit relay module 6210 communicates in each case with CAN transport protocol 6202, FlexRay ISO transport protocol 6204, communication module 6220, diagnostic communication management module 6230 and protocol data unit multiplexer 6240 with the aid of particular assigned communication protocol data units (communication PDUs) 6216202, 6216204, 621622, 621623, 621624, such as I-PDUs. The communication protocol data units are recognizable with the aid of their identification numbers and relayable. Run time environment 6100 and communication module 6220 communicate with the aid of protocol data units 61622. Network management interfaces modules 6250$_1$, 6250$_2$ and 6250$_3$ communicate in each case with assigned generic network management modules 6260$_1$, 6260$_2$ and 6260$_3$ with the aid of particular assigned network protocol data units 625626$_1$, 625626$_2$ and 625626$_3$. Communication management module 6270 communicates in each case with assigned generic network management modules 6260$_1$, 6260$_2$ and 6260$_3$ with the aid of particular assigned network management data 626627$_1$, 626627$_2$ and 626627$_3$.

Communication system abstraction layer 6400 includes a CAN interface 6402, a FlexRay interface 6404, and a Local Interconnect Network (LIN) interface 6408 having a LIN transport protocol (LIN TP). Protocol data unit relay module 6210 and interfaces 6402, 6404 and 6208 communicate in each case with the aid of particular assigned communication protocol data units 6216402, 6216404 and 6216408, such as I-PDUs. CAN transport protocol 6202 and FlexRay ISO transport protocol 6204 communicate in each case with assigned interface 6402 and 6404 with the aid of particular assigned protocol data units 62026402 and 62046404, such as N-PDUs. NM modules 6250$_2$, 6250$_3$ and 6250$_1$ communicate in each case with assigned interface 6402, 6408 and 6208 with the aid of particular assigned communication protocol data units 6256402, 6256404 and 6256408.

Communication drivers 6600 include a CAN driver 6602, a FlexRay driver 6604 and a LIN low level driver 6608. Interfaces 6402, 6404 and 6408 and particular assigned drivers 6602, 6604 and 6608 communicate with the aid of particular assigned interface protocol data units (interface PDUs) 6502, 6504 and 6508, such as L-PDUs. Standardized interface drivers may be defined for each interface, such as CAN, FlexRay or also PHYTER.

Application tool 210' sends messages to microcontroller 124 of control unit 120$_2$' which prompt microcontroller to generate corresponding communication signals with the aid of overall program 6000 and transmit these to another control unit 120$_1$', such as via vehicle bus 140. Depending on the situation and requirement, the sending of the messages or access to the memory may also take place on a corresponding layer of the computer-implemented method. For example, application tool 210' may read or change any arbitrary cell of the memory which serves, for example, as an element of a buffer or a stack by access with the aid of a debug function. For example, application tool 210' may generate, read, change or redirect protocol data units with the aid of diagnostic communication management module 6230, which is appropriately configured, the units being transmitted, for example, with the aid of protocol data unit relay module 6210 from or to a driver 6602, 6604 or 6608, or from or to an interface 6402, 6404 or 6408.

Application tool 210' is thus able to communicate with other control units via vehicle bus interface 122 and vehicle bus 140 with the aid of appropriate control of emulator interface 128, using microcontroller 124.

In the case of a computer-implemented method of control unit 120', connecting arrangement 130 may thus include accesses, such as debug accesses, to appropriate layers, such as software layers, of interface drivers, such as for vehicle bus interface 122 and emulator interface 128.

What is claimed is:

1. A control unit for controlling or regulating a component, comprising:
    a control arrangement, including:
        a processing arrangement to control or regulate the component;
        a bus port to connect the control arrangement to a vehicle bus for communicating with a further control unit;
        an application tool port to connect the control arrangement to an application tool for communicating with the control arrangement; and
        a connecting arrangement to connect the application tool port and the bus port so that the application tool is able to communicate via the bus port, wherein the connecting arrangement is configured via a debug interface of an emulator.

2. The control unit of claim 1, wherein the connecting arrangement includes a circuit.

3. The control unit of claim 1, wherein the connecting arrangement is configured by program instructions which are carried out in the control arrangement.

4. The control unit of claim 3, wherein the processing arrangement includes a processor and a memory, and wherein the program instructions are stored in the memory and are carried out by the processor.

5. The control unit of claim 1, wherein the application tool port is configured as an emulator probe port having a vehicle bus interface configured for connection to a vehicle bus port of the application tool.

6. A bus for at least one control unit,
    for controlling or regulating a component, the at least one control unit including a control arrangement having:
        a processing arrangement to control or regulate the component;
        a bus port to connect the control arrangement to a vehicle bus for communicating with a further control unit;
        an application tool port to connect the control arrangement to an application tool for communicating with the control arrangement; and
        a connecting arrangement to connect the application tool port and the bus port so that the application tool is able to communicate via the bus port, wherein the connecting arrangement is configured via a debug interface of an emulator.

7. A motor vehicle, comprising:
    a bus for at least one control unit for controlling or regulating a component, the at least one control unit including a control arrangement having:
        a processing arrangement to control or regulate the component;
        a bus port to connect the control arrangement to a vehicle bus for communicating with a further control unit;
        an application tool port to connect the control arrangement to an application tool for communicating with the control arrangement; and a connecting arrangement to connect the application tool port and the bus port so that the application tool is able to communicate via the bus port, wherein the connecting arrangement is configured via a debug interface of an emulator.

8. A method for operating a control unit, the method comprising:
    connecting an application tool port and a bus port of a control unit so that an application tool, which is connected to the application tool port, is able to communicate via the bus port;
    wherein the control unit is for controlling or regulating a component, and wherein the control unit includes a control arrangement having:
        a processing arrangement to control or regulate the component;
        the bus port to connect the control arrangement to a vehicle bus for communicating with a further control unit;
        the application tool port to connect the control arrangement to the application tool for communicating with the control arrangement; and
        a connecting arrangement to connect the application tool port and the bus port so that the application tool is able to communicate via the bus port, wherein the connecting arrangement is configured via a debug interface of an emulator.

9. The method of claim 8, wherein the connecting arrangement is configured by program instructions which are carried out in the control arrangement.

10. The method of claim 9, wherein the processing arrangement includes a processor and a memory, and wherein the program instructions are stored in the memory and are carried out by the processor.

11. The method of claim 8, wherein the application tool port is configured as an emulator probe port having a vehicle bus interface configured for connection to a vehicle bus port of the application tool.

12. A non-transitory computer readable medium having a computer program, comprising:
    a program code arrangement having program code for operating a control unit, by performing the following:
        connecting an application tool port and a bus port of a control unit so that an application tool, which is connected to the application tool port, is able to communicate via the bus port;
    wherein the control unit is for controlling or regulating a component, the control unit including a control arrangement having:
        a processing arrangement to control or regulate the component;
        the bus port to connect the control arrangement to a vehicle bus for communicating with a further control unit;
        the application tool port to connect the control arrangement to the application tool for communicating with the control arrangement; and
        a connecting arrangement to connect the application tool port and the bus port so that the application tool is able to communicate via the bus port, wherein the connecting arrangement is configured via a debug interface of an emulator.

13. An application tool for communicating with a control unit, comprising:
    an application tool arrangement to communicate via an application tool port in order to communicate via a bus;
    wherein the control unit is for controlling or regulating a component, and wherein the control unit includes a control arrangement having:
        a processing arrangement to control or regulate the component;
        a bus port to connect the control arrangement to a vehicle bus for communicating with a further control unit;
        the application tool port to connect the control arrangement to the application tool arrangement for communicating with the control arrangement; and
        a connecting arrangement to connect the application tool port and the bus port so that the application tool is able to communicate via the bus port, wherein the connecting arrangement is configured via a debug interface of an emulator.

14. The method of claim 8, wherein the connecting arrangement includes a circuit.

* * * * *